(12) United States Patent
Udiani

(10) Patent No.: US 7,664,698 B2
(45) Date of Patent: Feb. 16, 2010

(54) SIMPLIFIED INTERNET PAYMENT, SECURITY, & TAX ADMINISTRATION PROTOCOL (SIPSTAP)

(76) Inventor: Ifedayo Udiani, 40 Bayou Ave., Capitol Heights, MD (US) 20743

( * ) Notice: Subject to any disclaimer, the term of this patent is extended or adjusted under 35 U.S.C. 154(b) by 1107 days.

(21) Appl. No.: 10/673,754

(22) Filed: Sep. 29, 2003

(65) Prior Publication Data

US 2004/0139003 A1 Jul. 15, 2004

Related U.S. Application Data

(60) Provisional application No. 60/414,451, filed on Sep. 30, 2002.

(51) Int. Cl.
*G06F 17/60* (2006.01)
(52) U.S. Cl. .......................... 705/39; 705/64
(58) Field of Classification Search ........................ None
See application file for complete search history.

(56) References Cited

U.S. PATENT DOCUMENTS

| | | | | |
|---|---|---|---|---|
| 5,825,003 | A | * | 10/1998 | Jennings et al. ............. 235/379 |
| 5,999,967 | A | * | 12/1999 | Sundsted .................... 709/206 |
| 6,185,545 | B1 | * | 2/2001 | Resnick et al. ................ 705/40 |
| 7,249,054 | B2 | * | 7/2007 | Keil .............................. 705/21 |

(Continued)

OTHER PUBLICATIONS

"Sales Tax Compliance Software" by DPC of CCH incorporated p. 1-2 from web.archive.org/web/20020402075730/ht;://www.salestax.com/ p. 1 from http://web.archive.org/web/*/http://www.salestax.com.*

(Continued)

*Primary Examiner*—James P Trammell
*Assistant Examiner*—Mary Gregg
(74) *Attorney, Agent, or Firm*—Latimer & Mayberry IP Law, LLP; Michele L. Mayberry

(57) ABSTRACT

The Simplified Internet Payment, Security, & Tax Administration Protocol (SIPSTAP) is designed to simplify the payment procedure on the World Wide Web to enable uniform, easier, and secured access to buying and selling on the web. The invention overcomes the limitations of geographical location, currency and, non- possession of credit cards which deter most would- be users, by involving a third party whose major role is to generate Internet System of Values which can be purchased anywhere on the globe. It envisages that user access to the web may be through their email address, and by attaching electronic accounts to email addresses, Internet users will be able to purchase as many units as desired to credit their accounts while, online purchases are debited. The third party playing the role of an intermediary transfers the transaction sums to the merchants on the buyer's behalf.

14 Claims, 3 Drawing Sheets

U.S. PATENT DOCUMENTS

| | | | |
|---|---|---|---|
| 7,415,442 B1* | 8/2008 | Battaglini et al. | 705/64 |
| 2001/0027439 A1* | 10/2001 | Holtzman et al. | 705/39 |
| 2002/0026418 A1* | 2/2002 | Koppel et al. | 705/41 |
| 2002/0055911 A1* | 5/2002 | Guerreri | 705/64 |
| 2002/0120537 A1* | 8/2002 | Morea et al. | 705/35 |
| 2002/0123948 A1* | 9/2002 | Yumoto | 705/35 |
| 2002/0128977 A1* | 9/2002 | Nambiar et al. | 705/64 |
| 2003/0105709 A1* | 6/2003 | Orlando | 705/39 |
| 2003/0212642 A1* | 11/2003 | Weller et al. | 705/67 |
| 2004/0002918 A1* | 1/2004 | McCarthy et al. | 705/40 |
| 2004/0148252 A1* | 7/2004 | Fleishman | 705/39 |
| 2005/0021455 A1* | 1/2005 | Webster | 705/39 |
| 2005/0177437 A1* | 8/2005 | Ferrier | 705/26 |
| 2006/0143122 A1* | 6/2006 | Sines et al. | 705/40 |

OTHER PUBLICATIONS

British Post Office Investigates Methods of Providing Cheaper Utility Bills; Knight Ridder/Tribune Business News; Copyright 2001; Evening standard; 2 pages.*

* cited by examiner

SIMPLIFIED INTERNET PAYMENT, SECURITY, & TAX ADMINISTRATION PROTOCOL (SIPSTAP)

CROSS-REFERENCE TO RELATED APPLICATIONS

This application relies on the disclosure and claims the benefit of the filing date of U.S. Provisional Application No. 60/414,451, filed Sep. 30, 2002, the entire disclosure of which is herein incorporated by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The Internet has witnessed rapid growth and expansion especially from the early 1990s onwards. It has become accepted as a medium of general usage worldwide, as a result of which more and more people are turning to it for an array of reasons. As a market place, it is already providing opportunity for millions of peoples to trade in goods and services. But unlike other conventional market places, the Internet has no "legal tender". This is understandable given the fact that it transcends all natural and man-made political and geographical delineations. Presently, the means of payments in use include credit cards, bank checks and, money orders. Of these three, credit cards are the most popular because of their real time, on time value in facilitating e-commerce transactions.

But of significant concern is the fact that the use of credit cards is only popular in North America and, parts of Europe. Simply put, a vast proportion of Internet users world-wide does not have access to credit cards, as their economies are cash based. This limitation is severely affecting the volume and value of online transactions. According to a publication by Jupiter Communications, 33% of the U.S. population and, 90% of world population do not have credit cards but want to shop online. From this same study, it was found that 93% of online consumers above the age 45 did not complete their Internet transactions because of misuse and privacy concerns (AARP). Another research by the Peppers and Rogers Group has found that 98.9% of direct sales revenue earned on the web between 1999 and 2001 were on B2B basis. The future of Internet retail sales as forecasted for the next 8 years by this report is distressing. It is clear that the absence of a convenient, rational and globally acceptable payment mechanism will continue to stifle retail and individual transactions on the web.

From the emerging patterns, it can be assumed that B2B transactions and relationships have been on long before the advent of the Internet. Therefore, businesses have established trust and developed secured channels for making payments such as Letters of Credit, Transfers, Direct Debit, etc. which has now been carried over to the Internet. Retail users do not have this benefit. Another point of note is that corporations offering credit card services have minimum amounts of business below which, they will not touch. This further discourages retail purchases below $10 on the web.

Also, service providers are limited to incomes they generate from sign-up, monthly/annual subscriptions and, charges on some services from within specific geographic locations only whereas they stand a chance to get paid worldwide for offering the same services. The frustration of the glaring lack of access to credit cards by patrons and the attendant geographic gulf has forced Internet Service Providers (ISPs) merchants to offer so many services for 'free'. Consequently, most of the free offerings on the Internet have become subject to much abuse by some merchants and users. As the Internet has grown in popularity, so also has grown massive dread for it as a result of severe abuses like unwanted and frequent intrusion into peoples privacy, stealing of users confidential information, etc. The activities of spamming, hacking, e-bombing, spoofing and defacing of web pages by cyber terrorists constitute one huge albatross that Internet users are having to deal with albeit unsuccessfully. Studies have shown that cyber crimes are committed by young, impressionable IT students/personnel who derive pleasure in creating programs that run counter to the various applications driving the world wide web. And, they are able to commit these atrocities simply because after paying a fixed monthly/annual access charge the web is virtually free for anyone with access either to host a website, upload, download, receive or, send any 'stuff'. Attempts at evolving net ethics do not seem capable of addressing these problems.

ISPs have found themselves in this helpless situation because of the absence. of a payment method that enables them charge for services such as subscriptions, sending emails, conducting searches, joining news/chat groups, etc. As stated above this is because of the supranational nature of the Internet, the resultant scattered location of users across several international boundaries and the near impossibility of an acceptable Internet legal tender.

BRIEF SUMMARY OF THE INVENTION

The invention attempts to reform the Internet to enable a greater number of users enjoy e-commerce transactions, by enthroning a payment protocol and, curbing the abuses to which the web is being subjected to. It envisions the creation of a third party to act as an intermediary between service providers/merchants and retail users so as to facilitate Internet transaction processes. As part of the invention, e-accounts will be created for all email users. Since most service providers and merchants are limited by geographic locations, the third party will undertake the burden of providing units of value using smart card technologies, which, can be purchased by Internet users worldwide at domestic rates. Users may at any convenient time electronically load the values purchased as a credit to their personalized e-account. Online purchases are debited to the account subject to the account balance. All e-accounts are linked to the third party's server. The server records all purchases, and at pre-arranged basis pays the transaction sums to the merchants. This way, the requirement of ownership of credit cards and the disclosure of other personal financial information to conclude transactions over the Internet will be eliminated; the limitation of geographic location will be overcome; and retail services may be easily transacted on the one hand, while enabling tax authorities to maximize the collection of point-of sale taxes on the other.

For maximum effect, the invention will make user access to the Internet possible only through the ownership and operation of a valid email address. This is for control purposes and as a one-stop cure to most of the prevailing security abuses on the web.

DETAILED DESCRIPTION OF THE INVENTION

The method of e-commerce payment presently in use on a universal medium such as the Internet is limited in application due to the varying levels of economic development among the different countries and regions of the world. While the economies of countries such as those of North America and parts of Europe are card based, others are cash based. Therefore, the requirement of credit cards as means of payment in e-commerce transactions alienates a critical majority of the world population.

With the advent of the Internet and, in the spirit of globalization, traditional barriers to free trade are being broken. Peoples all over the world desire to trade and enjoy services without let or, hindrance. E-commerce services presently being enjoyed predominantly in North America and Europe are potentially to be enjoyed by billions of peoples in the other regions of the world provided there is a convenient system to pay for them.

Requirement of credit card(s) as chief means of payment and, the inherent limitations identified in paragraph one is costing web merchants a lot in lost sales. The present volume and value of Internet transactions is calculated to be less than one-tenth of the potentials that exist. Merchants are constrained to offer most services free (which in the ordinary cause of business should be paid for) because there are no rational ways to make users, irrespective of location globally to pay for them.

The price the Internet community is paying for a virtually free access is the increasing spate of cyber terrorism (spamming, flaming, virus attacks, spoofing, e-bombing, piracy, etc). The security implications are mind boggling as the perpetrators are spread beyond the jurisdiction of the laws of any one country. Unless a system such as that advocated by this invention is employed to restore sanity in the Internet system, the Internet community is doomed to live with these vices for a long time to come.

Projections in terms of turnover and profits arising from Internet transactions worldwide are staggering yet, all of these (will) go untaxed by the various tax administrations world-wide. The reasons for this are closely related to those advanced in paragraphs [0001] and [0003].

In order to stem these abuses, and to facilitate a boom in Internet retail sales world-wide and to enable tax authorities collect online sales/consumption taxes from source, the invention conceptualizes that all user access to any of the web's facilities and features will be granted only through the ownership and, possession of a valid email address whether or not, such facilities are offered free by the merchant.

An Electronic Account (e-account) is configured into web mailer's system administered by Internet Service Providers, which may be accessed by owners of email accounts using a secured password.

A third party institution is critical to the operation and success of this invention and, is required to act as an intermediary between the two parties (merchants and users). Its main role will be to generate Internet Standard of Value (ISV) using technologically advanced smart card technologies, which can be conveniently purchased by Internet users globally.

After purchasing units of ISV, the user may at any convenient time load the values encrypted on the card as a credit to the e-account. This account is to be managed by the third party institution.

In the event that a user makes a purchase decision, the third party's server electronically confirms if the balance in the e-account will cover the cost of the transaction and, if so, debits the account with the transaction value and, informs the merchant to either render service or, ship to the user. To complete the transaction, the merchant sends an Electronic receipt (e-receipt) in the form of an email to the user as proof of purchase.

In the same vein, all local or national taxes due may be deducted from the user's account at the point of transaction on behalf of the relevant administration(s).

Based upon mutually agreed terms and conditions, the third party transfers the cash equivalent to the merchant(s) irrespective of location anywhere on the globe.

In addition to performing the above stated roles, the third party will maintain a large database of volume and value of all Internet transactions. Regular analysis of these data will be of immense use to policy makers, marketers, traders, researchers and other interest groups.

The process envisaged by the invention removes the need to disclose personal financial information over insecure networks except such information is required for purposes other than to make a purchase transaction over the Internet. It also provides a chance for anyone desirous of purchasing goods or services on the web a leeway to do so.

Also, all transactions irrespective of value may be conveniently carried on so long as there is a favorable balance in the user's e-account. This is expected to boost retail sales.

In particular, the invention will enable mailer merchants to sell Electronic stamps (e-stamps) to subscribers as obtains in the regular mail/courier business. This will curb the indiscriminate mailing of mass and worthless mails on the web and, enhance netiquette.

An important security implication of the creation of a third party institution is the simplification of the process of tracking cyber crimes and criminals and, this will make the Internet a secured medium for all users.

The invention is an integrated one-stop solution to the problems of making and receiving payments on the web, inability of tax administrators to collect point-of-sale taxes, unrestricted access and insecurity.

Individual(s) desirous of Internet access signs up for an Internet Account, which is incorporated into a user's email address using a secured password. To activate the account, a user purchases units of account in the form of smart cards (in varying denominations) and, when prompted, enters the secured information encrypted in it to credit the account. User can make online purchases to the value of the account balance.

Internet accounts are connected to the third party's server and, it manages all the accounts on behalf of the owners. The third party's infrastructure authenticates purchase decisions by confirming the availability of funds in the account, classifies the purchase, debits the account to the value of the transaction, forwards a message to the merchant to ship/render service and, credits the merchant account on pre-arranged basis.

For merchants to enjoy this service, links must be created between them and the third party's server.

The merchant issues an electronic receipt (e-receipt) to the user's email account as a confirmation of the transaction.

Following this process, lots of e-commerce retail business will be transacted, privacy concerns are eliminated and, there will be no need to broadcast personal, confidential financial or, other information over the web except required for purposes other than making purchases over the Internet. All these are achieved on time, real time, anytime, globally.

Figure 1:
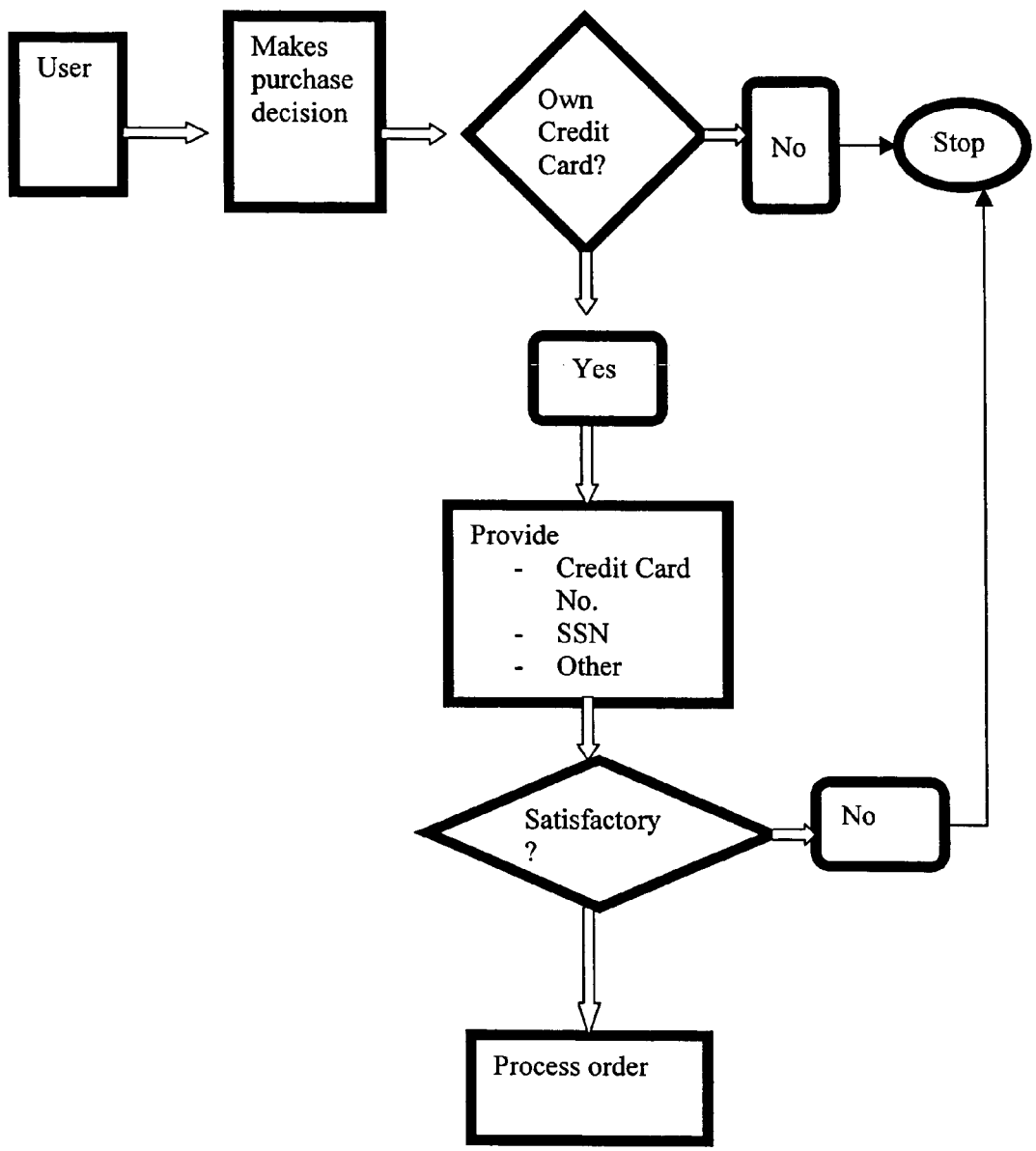
FIG. 1 captures the e-commerce payment system on the Internet. From available statistics, over 90% of Internet users never get past step 2 and, often end up frustrated in step 3. The other alternatives of payments by checks and money orders are unpopular because of territorial and postal limitations, and this defeats the objective of the web as an instantaneous medium of business and, communication.
Figure 2:
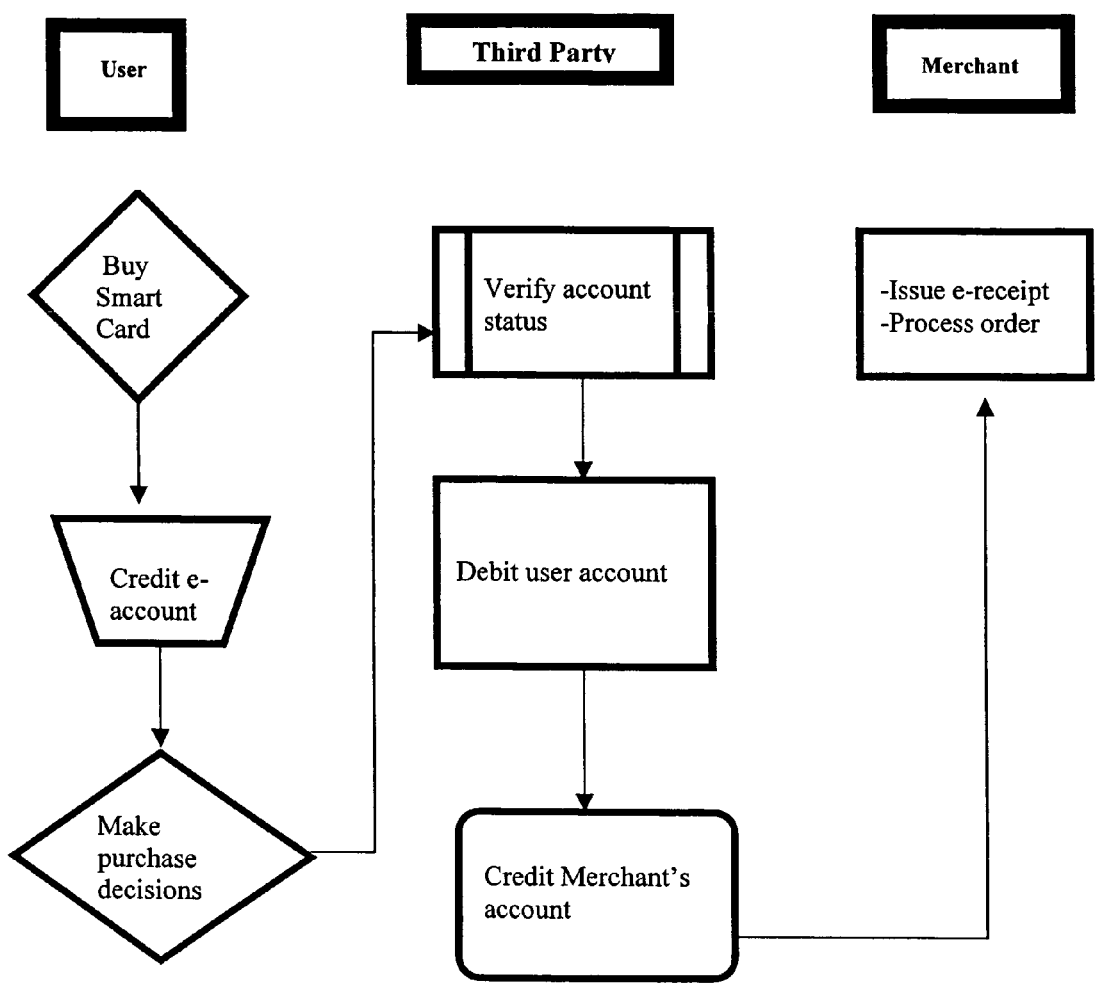
FIG. 2 shows the relationship that is created by the introduction of the Simplified Internet Payment, Security and Tax Administration Protocol (SIPSTAP) in e-commerce transactions.
Figure 3:
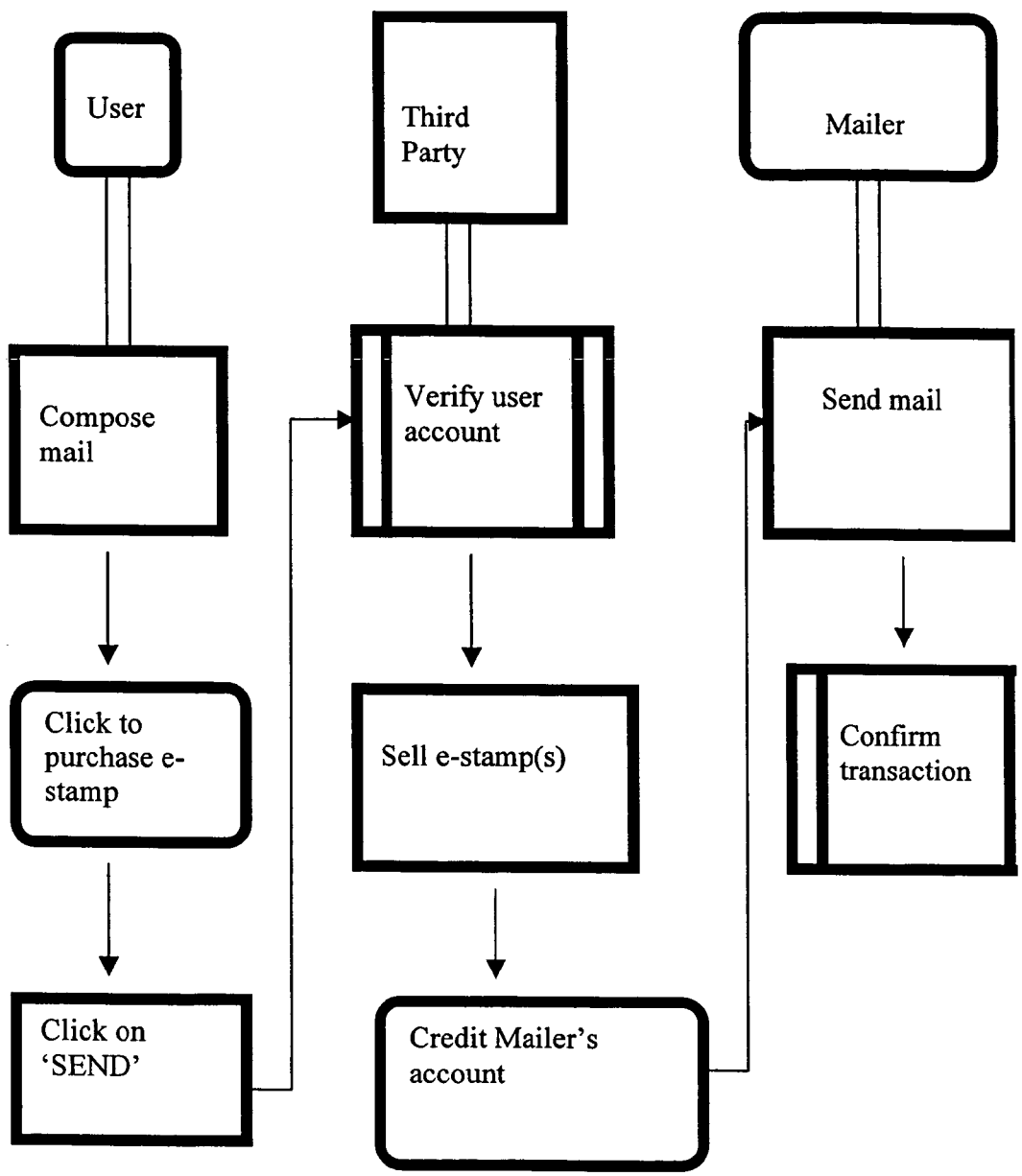

FIG. 3 describes a hypothetical example of how the invention may be applied by mailer merchants to receive payments for email services (presently offered freely, and subject to so much abuses) from any location worldwide.

User composes mail and, clicks on 'SEND'.

Third party server interacts with the user's server for user to purchase an electronic stamp (e-stamp) to be digitally affixed to the message.

If user affirms positively, user's account will be debited with the value of e-stamp, while the mailer's account is credited.

Mailer sends the message and, sends a confirmation mail to the user's email address.

In the event that the user refuses to affix a stamp or, the account balance is insufficient, the mail is not sent and service is denied.

This example will check mass mailing of worthless/harmful mails; give Internet users respite from junk mails; enable mailer merchants to be paid for their services; lead to increased, improved and innovative services and; generally lead to greater confidence in the system as the fastest and most convenient means of sending mails and texts.

What is claimed is:

1. An e-commerce system for payment over the internet comprising:
   a. at least one merchant website for selling goods or services by an online transaction;
   b. at least one shopper computer for accessing said merchant website and initiating said online transaction;
   c. a payment solutions provider server of a system payment solutions provider operationally connected with said shopper computer for establishing, maintaining, and replenishing an online account and operationally connected with said merchant website for making payment from a shopper to a merchant from said online account;
   d. wherein said online account is capable of being credited with an amount of value, without a credit card, debit card, or bank account, by receiving value information from a pre-paid system smart card issued by the system payment solutions provider;
   e. wherein said online account is capable of being credited with an amount of value by receiving value information from additional system smart cards; and
   f. wherein said online account is capable of being debited by an amount of value upon receiving instructions from said merchant website in response to said initiated transaction.

2. The e-commerce payment system of claim 1, further comprising said shopper computer and said payment solutions provider server operationally connected to provide for online account log in with an e-mail address and password.

3. The e-commerce payment system of claim 1, wherein said merchant website comprises capability for initiating said online transaction by clicking on a link to said payment solutions provider server.

4. The e-commerce payment system of claim 1, further comprising said online account and said payment solutions provider server operationally connected for electronically recording said debiting and crediting in real time.

5. The e-commerce payment system of claim 1, wherein said system smart card comprises a standard of value represented by 20 alpha numeric characters and comprises Internet Standard of Value (ISV) represented by value amounts of $10, $50, $100, $500, $1000 or higher or in foreign currency equivalence.

6. The e-commerce payment system of claim 1, wherein said decrease in value includes an amount for one or more of a purchase price, taxes, or fees.

7. The e-commerce payment system of claim 1, wherein said online transaction is an e-stamp purchase transaction.

8. A shopper-to-merchant e-commerce payment method comprising:
   a. providing for establishment of a shopper online account hosted in a payment solutions provider server of a system payment solutions provider;
   b. electronically depositing, without accessing a credit card, debit card or bank account, positive account value into said online account from a system smart card that is a pre-paid smart card issued by the system payment solutions provider, wherein said online account is capable of accepting additional value from additional system smart cards;
   c. accessing a merchant website and initiating payment for goods or services from said online account;
   d. electronically debiting an amount of value from said online account; and
   e. electronically crediting said amount of value to a merchant online account or a second shopper online account on the payment solutions provider server.

9. The e-commerce payment method of claim 8, further comprising logging into said online account with an e-mail address and password.

10. The e-commerce payment method of claim 8, wherein said initiating payment from said online account comprises clicking on a payment logo or identification information of said payment solutions provider.

11. The e-commerce payment method of claim 8, further comprising recording said debiting and crediting in real time.

12. The e-commerce payment method of claim 8, wherein said system smart card comprises a standard of value represented by 20 alpha numeric characters and comprises Internet Standard of Value (ISV) represented by value amounts of $10, $50, $100, $500, $1000 or higher or in foreign currency equivalence.

13. The e-commerce system of to claim 8, wherein said decrease in value includes an amount for one or more of a purchase price, taxes, or fees.

14. The e-commerce system of to claim 8, wherein said online transaction is an e-stamp purchase transaction.

* * * * *